United States Patent
Luckey

[11] 3,803,794
[45] Apr. 16, 1974

[54] CROSS MORTISED JOINT FOR A STRAIN ENERGY ERECTILE STRUCTURE

[75] Inventor: George R. Luckey, Playa Del Rey, Calif.

[73] Assignee: TRW, Redondo Beach, Calif.

[22] Filed: June 1, 1971

[21] Appl. No.: 148,493

[52] U.S. Cl. .............................. 52/758 A, 52/667
[51] Int. Cl. ............................................. F16b 7/00
[58] Field of Search .......... 287/189.36 A, 189.36 C, 287/51, 49, 54 A, 54 C; 52/663, 664, 665, 666, 667, 668, 669, 108

[56] References Cited
UNITED STATES PATENTS

| | | | |
|---|---|---|---|
| 2,060,387 | 11/1936 | Wallis | 52/665 X |
| 3,032,151 | 5/1962 | Allen et al. | 52/108 |
| 380,069 | 3/1888 | Wilson et al. | 52/668 |
| 686,232 | 11/1901 | Maher | 287/49 |
| 3,434,254 | 3/1969 | Rubin | 52/108 |
| 3,564,789 | 2/1971 | Vyvyan et al. | 52/108 |

Primary Examiner—David J. Williamowsky
Assistant Examiner—Wayne L. Shedd
Attorney, Agent, or Firm—Daniel T. Anderson; Donald R. Nyhagen; Daniel T. Anderson

[57] ABSTRACT

A cross mortised joint for a strain energy erectile structure including two intersecting thin-walled resiliently flexible tubular beams disposed in coplanar intersecting relation with one longitudinal wall portion of each beam passing through wall openings in the other beam and joined by thin flexible gusset plates at either side of the joint in such a way that the joint may be compressed to a flattened configuration wherein the beams store elastic strain energy for restoring the joint and beams to normal expanded configuration when released.

6 Claims, 3 Drawing Figures

PATENTED APR 16 1974  3,803,794

George R. Luckey
INVENTOR.

BY
ATTORNEY

CROSS MORTISED JOINT FOR A STRAIN ENERGY ERECTILE STRUCTURE

BACKGROUND OF THE INVENTION

1. Field of the Invention

This invention relates generally to strain energy erectile structures, that is structures which are compressible and foldable to a collapsed configuration wherein the structures store elastic strain energy for erecting the structures when released. The invention relates more particularly to a collapsible strain energy erectile cross mortised joint for a strain energy erectile tubular frame structure.

2. Prior Art

There is a continuing need for large truss structures and the like which can be collapsed for stowage in greatly reduced volume and subsequently deployed to envelop a volume or form planar, curved or contoured surfaces for space or terrestrial uses. Large parabolic antennas which can be contracted to a small volume for stowage in a space vehicle for launch into space orbit and then deployed are one such example. Maximum surface accuracy and minimum distortion due to mechanical loads and thermal gradients are fundamental requirements. The ultimate in design simplicity is also desired to insure deployment reliability.

Many expandable structure concepts have been proposed to fulfill these needs. Inherent disadvantages, such as inability to maintain desired accuracy in operation, unreliable deployment, design and manufacture complexities, etc., have deterred acceptance. One such concept proposed for space use, for example, is a truss reflector which exhibits good structural integrity and stability against thermal distortion, but possesses extreme mechanical complexity and hence low deployment reliability and high relative specific weight and cost.

Copending application entitled "Self-Erecting Collapsible and Foldable Tubular Beam," our Docket No. 70–040, discloses a strain energy erectile tubular beam frame structure constructed of strain energy erectile tubular beams of the general type disclosed in U.S. Pat. Nos. 3,217,328 and 3,434,254. These beams comprise tubes of relatively thin resiliently flexible sheet material having coplanar flanges extending longitudinally along diametrically opposed sides of the tubes. The sheet material from which the tubes are constructed may be a sheet plastic such as heat treated Mylar or Kapton, or a sheet metal. The beams are compressible and foldable to a flattened configuration wherein beams store elastic strain energy for erecting or restoring the beams to their normal expanded tubular configuration upon release.

The frame structure of the copending application has a number of such tubular beams joined at their ends to form a three-dimensional frame structure which may be collapsed to a compact, storage configuration and springs back to its normal expanded shape when released under the force of elastic strain energy stored in the structure.

SUMMARY OF THE INVENTION

The present invention provides a novel compressible or collapsible cross mortised joint for collapsible strain energy erectile frame structures of the general class described. This joint comprises strain energy erectile tubular beams arranged in coplanar intersecting relation. Each beam has a pair of separately formed wall sections each having an arcuate generally semi-cylindrical wall portion and coplanar flanges along the longitudinal edges of the wall portions. The two wall sections of each beam have their arcuate wall portions disposed in confronting relation to form a tube and their flanges in contact and secured to one another.

The beams intersect one another in such a way that one wall section of each beam extends through openings in a wall section of the other beam. Accordingly, one wall section of each beam is continuous through the other beam. The beams are secured to one another, as by their flexible gusset plates at opposite sides of the joint, to retain the beam in fixed angular relation and restrain the beams against relative longitudinal movement.

The cross mortised joint is compressible and normal to its plane into a flat configuration. In this flat configuration, the beams store elastic strain energy for erecting or restoring the joint to its normal expanded configuration upon release of the joint. The wall openings of each beam section through which extend the wall sections of the other tube are enlarged to provide clearance for the lateral spread of the wall sections when the joint is flattened.

DESCRIPTION OF THE PREFERRED EMBODIMENTS

Figure 1:
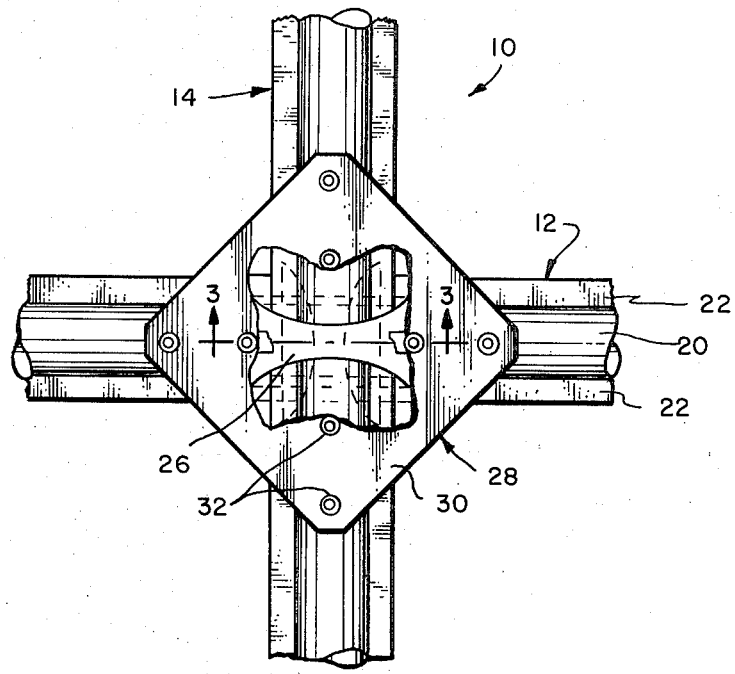
FIG. 1 is a plan view of a cross mortised joint according to the invention.

The illustrated cross mortised joint 10 of the invention has a pair of compressible and foldable strain energy erectile tubular beams 12 and 14 disposed in coplanar intersecting relation. Each beam 12, 14 has a pair of separately formed wall sections 16 and 18 each including an arcuate, generally semi-cylindrical wall section 20 and flanges 22 along the longitudinal edges of the arcuate wall portions. Wall sections 16, 18 are disposed side by side with their arcuate wall portions 20 confronting one another to form a tube and with their flanges 22 in contact. The contacting flanges are joined to form a unitary tubular beam configuration.

Wall section 16 of each beam 12, 14 has openings 24 in its wall. These openings are generally sector shaped openings which enter the flanged edges of the wall section and extend circumferentially about its arcuate wall portion a distance less than 90° so as to leave a longitudinal wall portion 26 between the wall openings.

The beams 12, 14 are disposed in coplanar intersecting relation with the wall section 18 of each beam passing through the openings 24 in the wall section 16 of the other beam. Accordingly, wall section 18 of each beam is continuous through the other beam. The longitudinal wall portion 26 of each beam laterally spans the continuous wall section 18 of the other beam.

Beam 12, 14 are joined by connecting means 28 which retain the beams in fixed angular relation and restrain the beams against relative endwise movement. The particular connecting means shown comprise relatively thin flexible gusset plates 30 of plastic or metal at opposite sides of the joint and secured to the beams by rivets 32.

Figure 2:
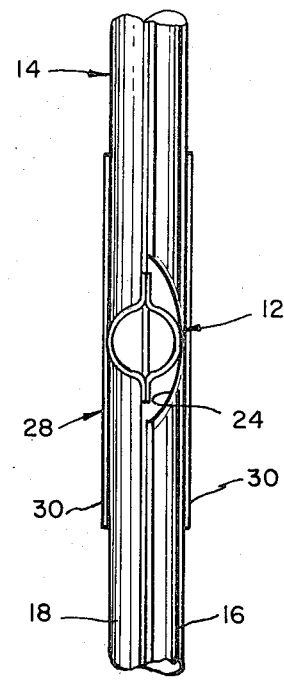
FIG. 2 is a side elevation of the joint.
Figure 3:
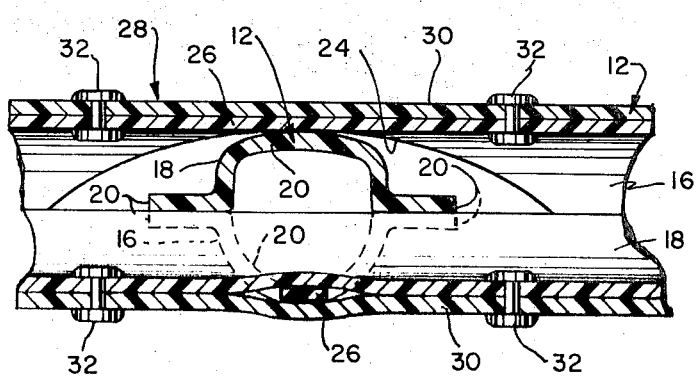
FIG. 3 is an enlarged section taken on line 3—3 in FIG. 1.

The present cross mortised joint 10 is compressible normal to its plane to flattened, collapsed configuration wherein the arcuate wall portions 20 of the beams are flattened substantially into the plane of the beam flanges 22. The beam wall openings 24 are enlarged longitudinally of the beams to accommodate the lateral beam spread which occurs during this compression of the joint. When the joint is thus compressed, the beams 12, 14 store elastic strain energy which restores the joint to its normal expanded configuration of FIGS. 1 and 2 when the joint is released.

What is claimed as new in support of Letters Patent is:

1. A cross mortised joint for a strain energy erectile structure comprising:
   a pair of tubular beams each including two mirror image wall sections having confronting arcuate wall portions and joined contacting flanges along the longitudinal edges of said wall portions;
   said beam wall sections being constructed of a relatively thin resiliently flexible sheet material of a thickness such that each beam may be flattened substantially into the plane of its flanges and the flattened beam stores elastic strain energy for restoring the beam to its tubular shape when released;
   said beams being disposed in coplanar intersecting relation with their flanges substantially in a common plane;
   one wall section only of each beam having transversely aligned lateral openings receiving the corresponding wall section of the other beam with a medial longitudinal wall portion remaining between said openings and spanning said corresponding wall section, whereby each wall section of each beam is at least partially continuous through the other beam; and
   said joint being compressible to a flat configuration wherein said beams store elastic strain energy for restoring said joint to its normal expanded configuration when released.

2. A joint according to claim 1 wherein:
   the flanges of said corresponding wall sections abut one another face to face where they cross.

3. A joint according to claim 1 including:
   connecting means at the intersection of said beams joining the latter to restrain each beam against endwise movement relative to the other beam.

4. A joint according to claim 3 wherein:
   said connecting means comprise relatively thin flexible gusset plates at opposite sides of the beam intersection; and
   means securing said plates to said beams.

5. A joint according to claim 4 wherein:
   the openings in said beams are enlarged lengthwise of the beams relative to said corresponding wall sections to provide the clearance for the latter wall sections necessary for compression of said joint to flat configuration.

6. A joint according to claim 1 wherein:
   the openings in said beams are enlarged lengthwise of the beams relative to said corresponding wall sections to provide the clearance for the latter wall sections necessary for compression of said joint to flat configuration.

* * * * *